United States Patent
Chen

(10) Patent No.: US 11,183,851 B1
(45) Date of Patent: Nov. 23, 2021

(54) APPARATUS AND METHOD FOR AC AND DC POWER CO-DISTRIBUTION

(71) Applicant: Entrantech Inc., Gilroy, CA (US)

(72) Inventor: Kong-Chen Chen, Gilroy, CA (US)

(73) Assignee: Entrantech Inc., Gilroy, CA (US)

( * ) Notice: Subject to any disclaimer, the term of this patent is extended or adjusted under 35 U.S.C. 154(b) by 0 days.

(21) Appl. No.: 17/062,413

(22) Filed: Oct. 2, 2020

Related U.S. Application Data

(60) Provisional application No. 63/050,098, filed on Jul. 9, 2020.

(51) Int. Cl.
| | |
|---|---|
| *H02J 3/38* | (2006.01) |
| *H02H 7/22* | (2006.01) |
| *H02J 7/35* | (2006.01) |
| *H02M 7/04* | (2006.01) |

(52) U.S. Cl.
CPC ............... *H02J 3/381* (2013.01); *H02H 7/22* (2013.01); *H02J 7/35* (2013.01); *H02J 2300/24* (2020.01); *H02J 2300/28* (2020.01); *H02M 7/04* (2013.01)

(58) Field of Classification Search
CPC .......... H02J 3/381; H02J 3/38; H02J 2300/28; H02J 7/35; H02H 7/22; H02M 7/04
See application file for complete search history.

(56) References Cited

U.S. PATENT DOCUMENTS 5,786,642 A * 7/1998 Wilhelm ................... H02J 4/00
307/72

* cited by examiner

*Primary Examiner* — Robert L Deberadinis
(74) *Attorney, Agent, or Firm* — Weaver Austin Villeneuve & Sampson LLP

(57) ABSTRACT

Existing AC power distribution infrastructure in a building is leveraged for the DC power distribution, where one or more DC powers are delivered over an existing power distribution circuit and existing AC power sockets. A DC power attachment is coupled to an existing AC power socket to provide various DC voltages, including a high DC voltage for high power DC devices and a low DC voltage for low power DC devices. Transition from the AC centric environment to a DC environment is thus simplified thereby improving energy usage efficiency and making DC power readily available.

38 Claims, 5 Drawing Sheets

Composite Power Panel for AC and Dual DC power Distribution (Cont.)

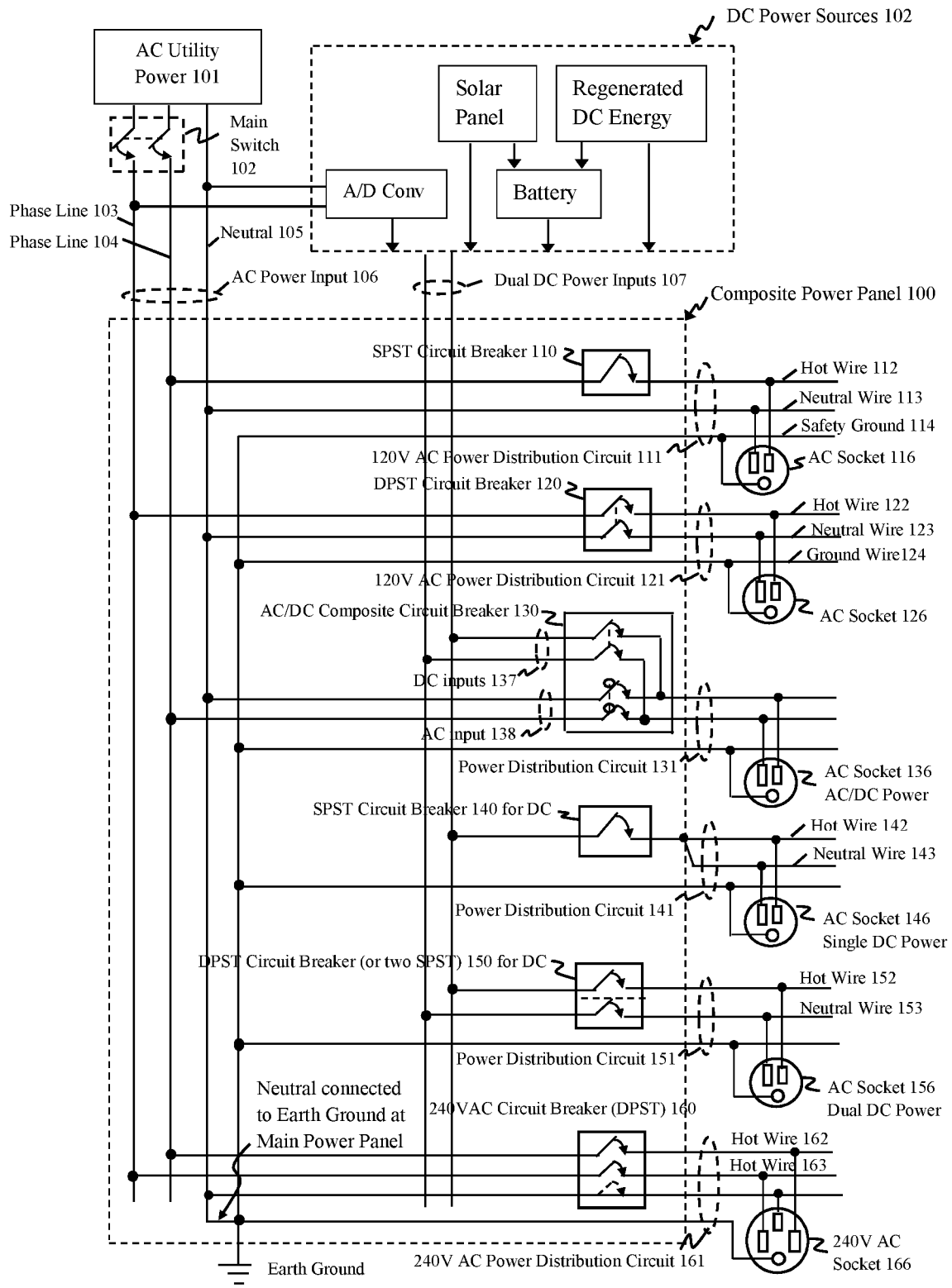
Figure 1: Composite Power Panel for AC and Dual DC power Distribution

Figure 2: Composite Power Panel for AC and Dual DC power Distribution (Cont.)
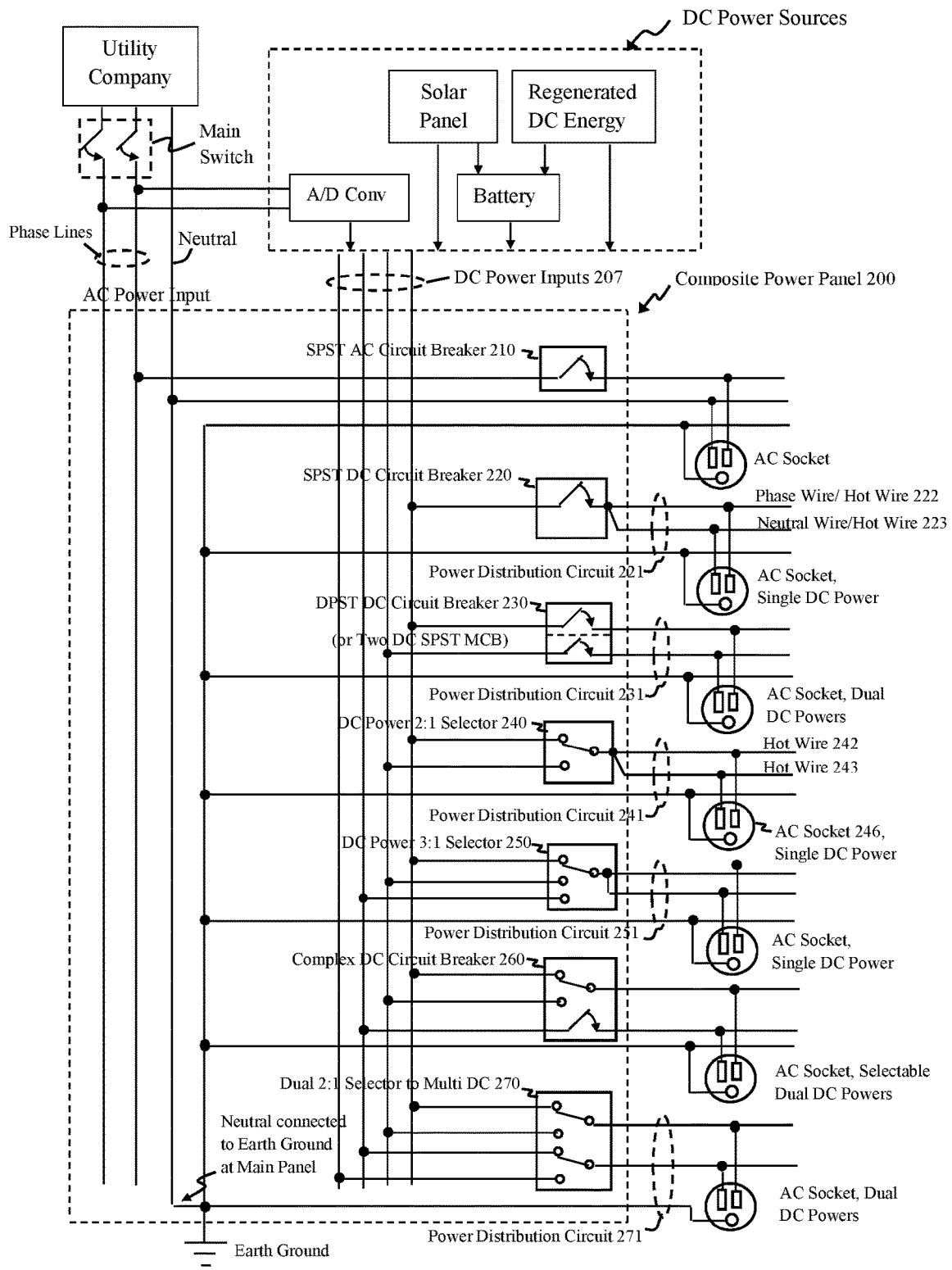

FIG. 3A  2:1 Selector in Power Panel for DC Power Distribution with Protection Devices
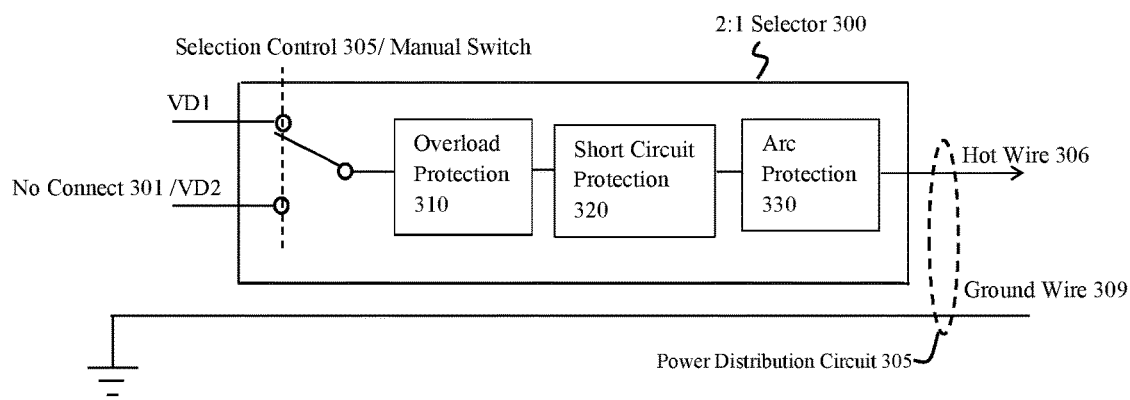
FIG. 3B  3:1 Selector in Power Panel for DC Power Distribution with Protection
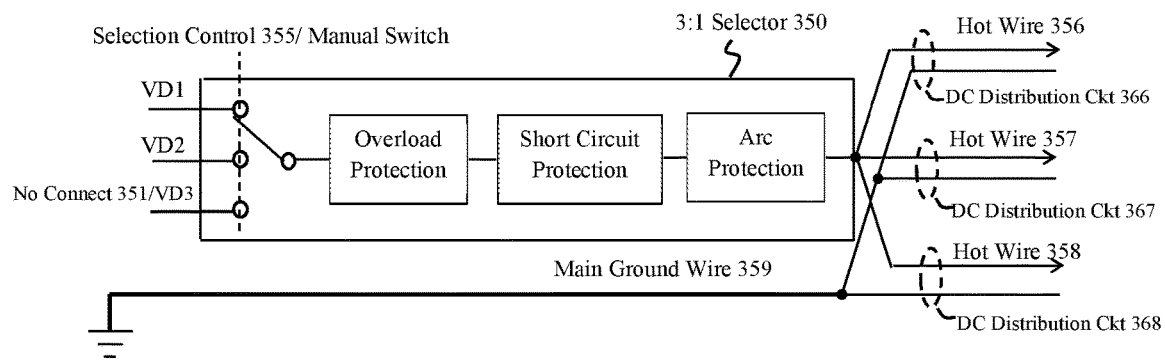

Figure 4  DC Power Attachment for Dual DC Power Adaption
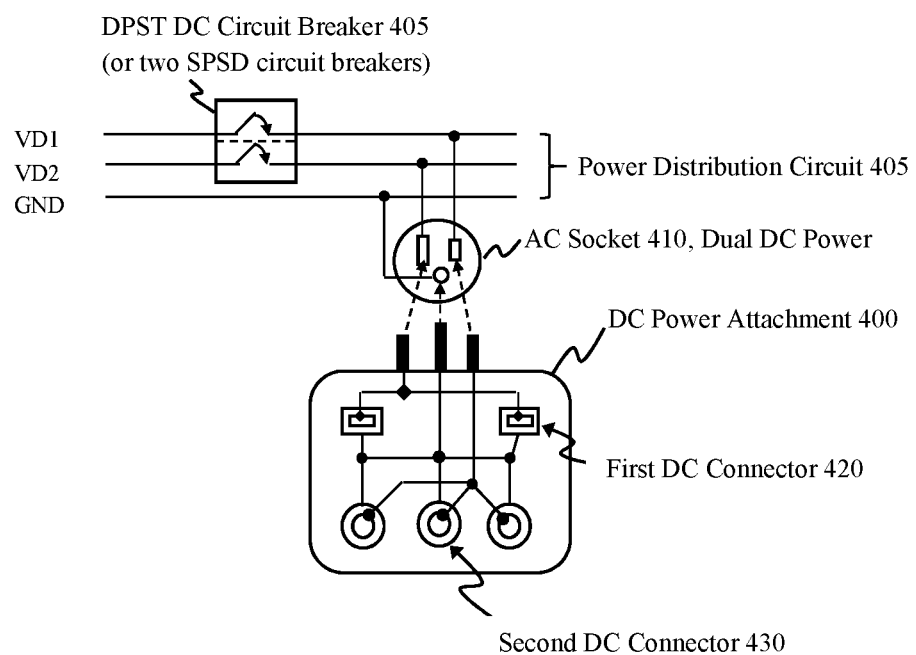

Figure 5  DC Power Attachment Power and AC Warning
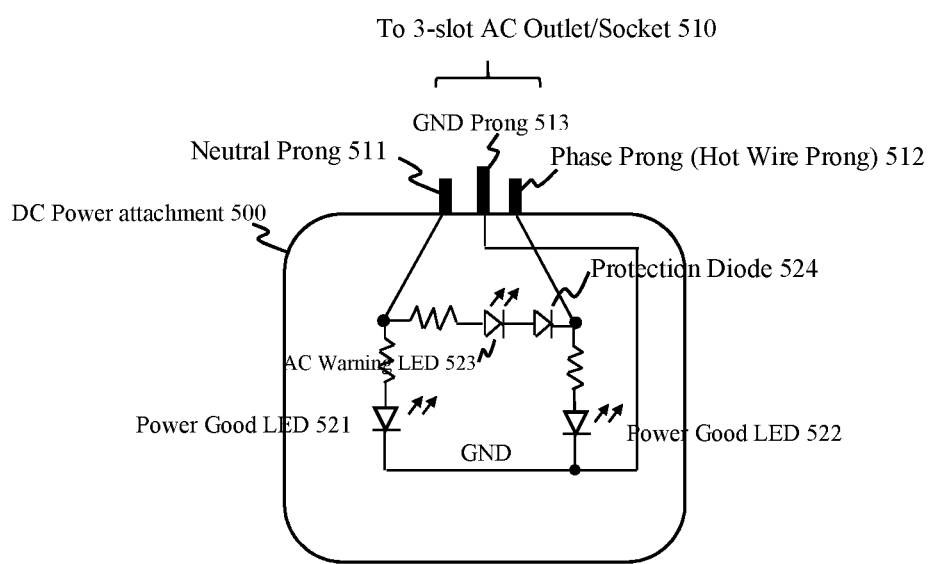

APPARATUS AND METHOD FOR AC AND DC POWER CO-DISTRIBUTION

CROSS REFERENCE TO RELATED APPLICATIONS

The present application claims benefit under 35 USC 119(e) of Application Ser. No. 63/050,098, filed Jul. 9, 2020, the content of which is incorporated herein by reference in its entirety.

FIELD OF THE INVENTION

The present invention relates to AC and DC power distribution.

BACKGROUND

AC power is widely used in residential houses, offices, commercial building, public areas, and the like. Almost all buildings have been wired for 120V or 230V AC power. However, most electronic devices contain integrated circuits (IC), which require DC power to operate. To convert AC power into DC to power electronic devices or to charge a battery, a power adaptor is used.

Power adapters, however, are cumbersome, inconvenient to carry, and often incompatible from product to product, company to company, besides country to country. Therefore, a user may typically carry multiple adapters, one for each electronic to obtain power. In addition, most electronic products often come with their own power adapters. When a new electronic product is commercialized, an existing adapter of the older generation is often discarded, resulting in excessive e-waste and adverse environmental impact. Power adapters that convert AC power into DC may also have significant energy loss due to sub-conversion efficiency.

A technology that could provide DC power in most places, so that people have easy access to DC powers for electronic devices to use without the need to carry any power adapter is most desirable. The apparatus and method to make DC power ubiquitous in our living space and to bring convenience to our daily life are disclosed hereafter.

SUMMARY

A method and a system, in accordance with one embodiment of the present invention is adapted to enable, among other things, DC power delivery on an existing AC distribution infrastructure to create an AC and DC co-existent environment so that in a building the original AC equipment can continue to use AC powers while electronic devices can directly receive DC power from an existing power socket without needing any power adaptor to convert AC power into DC. The direct use of DC power can benefit from existing AC distribution infrastructure. The co-existence of AC and DC power has many advantages and can use AC and DC powers more conveniently and efficiently.

In one embodiment, a power panel receives both AC and DC powers, where circuit breakers disposed in the panel control the delivery of AC and DC power to a multitude of power distribution interconnect circuits and AC sockets. A connection device, namely a DC power attachment device, adapted to be coupled with an existing AC socket, supplies DC power for devices to use. A multitude of DC voltages and DC connectors are outfitted on the power attachment device for various electronic devices including, for example, low voltage hand-held devices and high voltage computing products to obtain DC powers.

BRIEF DESCRIPTION OF DRAWINGS

FIG. 1 illustrates a composite power panel and circuit breakers with connection to a multitude of power distribution circuits, where both AC and DC powers are input to the power panel for circuit breakers to distribute AC or DC power to respective power distribution circuit in accordance with one exemplary embodiment of the present invention.

FIG. 2 illustrates a composite power panel showing more variations in DC circuit breakers and the use of power selectors in the power panel, in accordance with one exemplary embodiment of the present invention.

FIG. 3A illustrates a DC power selector in 2:1 configuration in accordance with one exemplary embodiment of the present invention.

FIG. 3B illustrates a DC power selector in 3:1 configuration in accordance with one exemplary embodiment of the present invention.

FIG. 4 illustrates the internal connections of a DC power attachment for dual-DC power delivery, in accordance with one exemplary embodiment of the present invention.

FIG. 5 illustrates power indicators in a DC power attachment, in accordance with one exemplary embodiment of the present invention.

DETAIL DESCRIPTIONS

Power Source

In the US, the AC power delivered by utility company includes two hot wires at 180° out of phase and a neutral, where one hot wire and neutral provide a 120V AC, while two hot wires provide a 240V AC. Both voltages are at 60 Hz. The common AC power used in Europe is 230V at 50 Hz, which includes a hot wire and a neutral. All these AC supplies are single phase.

DC power is readily available from solar panels installed on roof top or at open space, or from other renewable energy resources, such as wind turbine. The DC power can also be generated by an AC-to-DC power converter, where the AC power from utility company is converted into DC voltages. A power converter could be installed internally or externally to a power panel, depending upon available space and heat dissipation capability. DC power may be sourced directly from utility company. It may also be available from battery charged by renewable energy resource.

Composite Power Panel

The power panels in use today are either an AC power panel or a DC power panel. In an AC power panel, AC circuit breakers are chosen to distribute AC power to the distribution interconnects. In a DC power panel, DC circuit breakers distribute DC power. The AC power panels are commonly installed in a building or house for residential use. The DC power panels are mainly for industrial applications, such as to control the solar power distribution or to deliver DC power for communication equipment or racks of servers to use.

The AC circuit breaker and the DC circuit breaker have similar switching function for the on/off control of power connected to it. Both circuit breakers may have similar protection functions, such as to protect a circuit from current overload or electric short. But AC power is far more dangerous. Accidentally touching an AC power line may suffer electric shock and could be fatal. Thus, an AC circuit breaker may include extra safety feature, such as shock protection, which monitors the current imbalance between hot wire and neutral in an AC circuit breaker. DC power is safer to use. There is no current path caused by capacitance-coupling between human body and ground to trigger electric shock at low DC voltages. Thus, a DC circuit breaker normally does not include a shock protection device. In addition, an AC circuit break may be switched on or off at the AC zero-crossing, but a DC circuit breaker is always switched off at a constant DC voltage. which creates more severe arcing during the on/off switching.

A composite power panel is a power panel where AC and DC powers co-exist to facilitate the distribution of both AC power and DC power by leveraging the existing AC power distribution infrastructure within a building, so that users have a flexibility to select either AC power or DC power for residential or office use. In accordance with one embodiment of the present invention, a composite power panel is connected to both AC power and DC power at the power input to panel and includes both AC and DC circuit breakers, where AC circuit breaker delivers AC power and DC circuit breaker delivers DC power on respective power distribution interconnects to the existing AC power sockets. A DC power attachment is plugged or coupled to an AC socket to provide DC powers for use without including a converter to convert AC into DC power. The power distribution interconnect is a power distribution circuit, alternatively referred to herein as a distribution circuit.

FIG. 1 illustrates an exemplary composite power panel 100 including AC circuit breakers 110, 120, 160, DC circuit breakers 140, 150, and an AC/DC composite circuit breaker 130 and their wiring connections for AC and DC power co-distribution. There are some variations in the power distribution circuits. For example, in the US, a 120V AC distribution circuit, such as the power distribution circuit 111, typically includes three wires, i.e. one hot wire 112, one neutral wire 113 and one safety ground 114, where the hot wire 112 is selected from one of the two-phase lines 103, 104, sourced from AC utility power 101, and the neutral wire 113 is the neutral 105 in part of the AC power input 106. The two-phase wires 103, 104 can be disconnected from the AC utility power 101 by a main switch 102. For the case of 240V (60 Hz) AC power distribution, a distribution circuit 161 typically includes 4 wires, i.e. 2-hot wires 162, 163, 1-neutral and 1 safety ground. In Europe, a common 230V (50 Hz) AC power distribution consists of 3 wires, similar to the US 120V AC distribution, i.e. 1-hot, 1-neutral and 1-safety ground. In general, the AC power distribution refers to 120V AC and 240V AC in the US, and refers to 230V AC in Europe. In one embodiment, the DC powers to be distributed on an AC power distribution circuit may include a single DC voltage, two DC voltages, or even three DC voltages, depending upon the wiring configuration of the distribution circuit.

A circuit breaker used in the US for 120V AC power distribution typically is a single-pole, single-throw (SPST) switch, where only the hot wire is switched. In countries confirming to the IEC wiring and grounding convention, it uses a double-pole, single-strobe (DPST) switch for the 230V AC power distribution, which switches both hot wire and neutral in circuit breaker. The DPST switch circuit breaker, namely a double-pole miniature circuit breaker (DP MCB), may be used in power panel for 120V AC power distribution as well. It is usually for providing shock protection and is installed next to AC power input in power panel with its AC output becoming the AC power input for all other successive AC circuit breakers next to it in the power panel. In the US, the circuit breaker used for 240V AC power distribution is also a double-pole, single-throw (DPST) switch, which switches both hot wires. A three-pole breaker may be used in the newer installation for 240V AC to switch or to protect the neutral as well.

In FIG. 1, the circuit breaker 110 is a SPST AC circuit breaker for 120V AC power distribution in the US, where one of the two-phase wires 103, 104 is connected to the switch in circuit breaker 110. The neutral 105 is also connected to the circuit breaker 110, but is not switched. The switched hot wire 112 output from the circuit breaker 110 and the un-switched neutral 113 output from the composite power panel 100, plus a safety ground 114, are connected to an AC power distribution circuit 111—a total of three wires, where socket 116 is connected to the power distribution circuit 111 to obtain 120V AC power.

The circuit breaker 120 in FIG. 1 is a double-pole, single-throw (DPST) circuit breaker for countries where it requires to switch both hot wire and neutral in circuit breaker for AC power distribution. It is normally used for 230V AC and is also applicable for 120V AC power distribution. Since one of the phase wires and the neutral are input and switched in circuit breaker 120, the circuit breaker 120 is capable of monitoring any current imbalance between these two wires to include a shock protection function in it. The selected phase wire and the neutral input to circuit breaker 120 are then connected to the hot wire 122 and the neutral wire 123 in an AC power distribution circuit 121. There is no current flow in the safety ground wire 124 in the AC power distribution circuit 121.

The SPST circuit breaker 140 is applicable for single DC power distribution. In an embodiment, one of the DC powers input 107 to the composite power panel 100 is connected to the switch of circuit breaker 140, where the switched output may be connected to the hot wire 142 or to the neutral 143, or connected to both hot wire 142 and neutral 143 in an existing power distribution circuit 141. The single DC power is further delivered to the socket 146 connected to the power distribution circuit 141.

In an embodiment, the DPST circuit breaker 150 is applicable for distributing dual DC power inputs 107 from DC power source 102, where each DC power input is connected to one input pole of the double-pole circuit breaker 150, and where the two throw outputs are connected to the hot wire 152 and the neutral 153 respectively in an existing AC power distribution circuit 151. Different from a DPST circuit breaker being used in AC power distribution, where it typically includes the shock protection, namely the ground fault circuit interrupt (GFCI) protection in the US or the residual-current device (RCD) protection in Europe, when a DPST circuit breaker is used in DC power distribution, the currents flowing on each pole of the DC circuit breaker 150 are un-equal most of time. Thus, there is no GFCI or RCD feature in a double-pole circuit breaker for DC applications. Two separate switches may be used in the DPST circuit breaker 150 for DC applications to control the switching of each pole individually. Or, it may combine two SPST circuit breakers in the composite power panel 100 to devise a DPST function.

The similarity in the switching function, a DPST switch could be used as an AC circuit breaker or as a DC circuit breaker, if the shock protection feature is excluded from the switch. If a shock protection breaker or a RCD breaker is installed at the front-end next to the AC power input to protect all other successive AC circuit breakers from shock abnormity, then all successive DPST switches without shock protection feature can be used as an AC circuit breaker or as a DC circuit breaker to connect to either AC power or DC power. In this case, only the connection to an AC power or a DC power differentiates a circuit breaker as an AC circuit breaker or a DC circuit breaker. Since a circuit breaker is infrequently switched on/off inside a power panel, the switching arc encountered by a DC distribution circuit is less critical. Similarly, a SPST switch may also be used as an AC circuit breaker or a DC circuit breaker in the US. There is no built-in shock protection device in these cases.

Since an AC power distribution circuit includes two power distribution wires, i.e. a hot wire and a neutral, plus a safety ground, two different DC voltages may be connected to the two input poles of a DPST circuit breaker respectively, and the two output throws of the circuit breaker can then connect two DC voltages to the two wires of an existing distribution circuit. In an embodiment, two DC powers, including a high DC voltage and a low DC voltage, can be distributed over an existing AC power distribution circuit to the AC sockets connected on the distribution circuit, so that devices require higher DC voltage will have access to the high voltage wire at the socket, and devices use lower DC voltage will also have access to the low voltage wire. Both voltages are available concurrently on the same socket.

A DC power attachment device, which is pluggable to an AC socket or is mountable on a supporting structure to replace an AC socket, may include multiple DC power output connectors with multiple DC voltages available at its output connectors. This is different from an AC adaptor, where an AC socket only supports one AC adaptor to plug in at a time to source single AC power for use by an AC device. In case an extension power strip is used to enable more AC devices to access AC power from the socket, it is more likely to cause its AC circuit breaker to trip because of higher power demands by the AC devices on the same power strip. In an embodiment, the DC power attachment does not include an AC-to-DC converter in it as the AC power adaptor does to obtain DC power for use. For DC power distribution, the ground wire in the distribution circuit is functioning as a current return path for both DC powers, rather than functioning as a safety ground as in the case of AC power distribution.

The circuit breaker 130 is another example of circuit breaker which selects either AC power or two DC powers as inputs similar to a double-pole, double-throw (DPDT) switch, but reversing the order of inputs and outputs. The AC input 138 can be 120V or 230V AC power. The circuit breaker 130, that can function as an AC circuit breaker or as a DC circuit breaker, is a composite circuit breaker. In an embodiment, for a composite circuit breaker 130, an AC hot wire and neutral as AC power input 138 are connected to one set of inputs in circuit breaker 130, and two DC inputs 137, including a high DC voltage and a low DC voltage, are connected to the other set of inputs, where a manual switch selects either AC power input or two DC power inputs for output to an AC power distribution circuit 131 for either AC power or DC power delivery to the AC sockets 136 connected to it. The composite circuit breaker 130 may include common safety features for both AC and DC powers, such as short circuit protection and overload protection, plus safety features unique to AC and DC respectively, such as the shock protection for AC power. The composite circuit breaker 130 is adapted to be an AC circuit breaker, a DC circuit breaker, or a selectable circuit breaker, depending on its input connection being only to an AC power, or only to a set of DC powers, or being selectable between the two.

The circuit breaker 160 in FIG. 1 is an example for 240V AC power distribution. In 1996, the National Electrical Code (NEC) begins requiring 4-conductor outlets with a separate ground wire from the neutral to prevent the sharing of neutral and ground that may cause shock or fire as the case of three prong outlets for 240V AC. Thus, the power distribution circuit 161 for 240V AC typically has 4 wires, i.e. two hot wires 162, 163, a neutral and a safety ground. A double-pole circuit breaker may be used to switch both hot wires, but a triple-pole circuit breaker may be chosen for 240V AC to further protect neutral. In an embodiment, a high DC voltage and a low DC voltage are connected to the circuit breaker 160 for DC power distribution on an original 240V AC power distribution circuit 161 with ground wire functions as DC powers current return path. If a triple-pole circuit breaker is used for DC power distribution on a 4-wire power distribution circuit, then the distribution circuit can be connected to a very high DC voltage, a high DC voltage and a low DC voltage source, for example, at 48V, 24V and 12V DC respectively, with ground wire functioning as a DC current return path.

Different from a double-pole AC circuit breaker, where a phase wire and neutral being connected to an AC power source form a single AC current loop with neutral functioning as AC current return path, in the DC applications the two input contacts of a double-pole circuit breaker may be connected to two different DC voltages to form two DC current loops with ground as a current return path. The two hot wires in the distribution circuit may have the same DC voltage or may be at different DC voltages, depending on the input and output connection setup at the circuit breaker. Triple DC current loops may be formed if a triple-pole DC circuit breaker is chosen. More DC power distribution is possible if more wires have been included in a power distribution circuit.

FIG. 2 shows more example of DC power distribution with selectors 240, 250, 260, 270 in a composite power panel 200 for AC and DC power distributions, where more DC powers 207 at various voltages are input to the composite power panel 200. The SPST circuit breaker 210 is commonly used for the US 120V AC power distribution. The SPST circuit breaker 220 has the same switch configuration as the circuit breaker 210, with the switched input being connected to a DC power source and the output tied to the two hot wires 222, 223, i.e. originally the phase wire and the neutral, of an existing AC power distribution circuit 221 to provide the same DC voltage on both hot wires.

The DPST circuit breaker 230 with DC safety feature is used for dual DC power distribution on an existing AC power distribution circuit 231. Since an input contact is only connected to an output contact in circuit breaker 230, two separate SPST circuit breakers may be grouped in the power panel to function as a double-pole circuit breaker to control the delivery of two DC powers to the power distribution circuit 231. Either single or dual switch may be used to control the on-off switching of the DPST DC circuit breaker 230. Thus, DC powers of the same voltage or different voltages may be supplied concurrently from the two output contacts of a DPST circuit breaker to the two hot wires in a power distribution circuit for single switch configuration in the DC circuit breaker 230. Alternatively, the same or two different DC voltages may be output to the two hot wires of a distribution circuit separately and selectively for dual switches configuration. When a DC voltage is not required in the dual switching configuration, user may simply turn-off the corresponding switch to disconnect power to the associated hot wire, while the other switch can be still "on" to supply its DC power.

The power selector 240 in FIG. 2 is a 2:1 selector which selects one of two DC inputs from DC power sources, such as 12V or 6V, to the AC power distribution circuit 241. The single DC output from the selector can be tied to both hot wires 242, 243 in a power distribution circuit 241 to deliver the same DC voltage to the two hot wires 242, 243 and to the two hot slots in an AC socket 246. The 2:1 power selector is different from a DPST circuit breaker, as a DPST circuit breaker connect two inputs to its two outputs if being switched on. The DC power selector 250 is a 3:1 selector, which selects one of three DC power inputs connected to its selector inputs to distribute DC power to the two hot wires in a distribution circuit 251.

The circuit breaker 260 is complex DC circuit breaker, which combines a 2:1 selector and a circuit switch in a circuit breaker to increase its flexibility in DC power selection. The dual 2:1 power selector 270 enables a selection between two pairs of DC voltages for two DC voltages to output to an AC power distribution circuit 271. Its functionality is similar to a DPDT circuit breaker used in power panel except its input port and output port being reversed. Depending upon the method of connection, a dual 2:1 selector may be switched to a power-off state, if two of its four selector inputs do not connect to any power.

FIG. 3A is an example of a 2:1 power selector for use in power panel to select between VD1 from DC power inputs and No Connect 301 with a selection control 305 for delivering VD1 to a power distribution circuit 305, which includes, in part, a hot wire 306 and ground wire 309. By switching the input of 2:1 selector 300 to No Connect 301 position, it disconnects DC power to the selector and the function of the 2:1 selector 300 is the same as a SPST circuit breaker in this case. The No Connect 301 at the input of 2:1 selector 300 may be connected to a DC voltage VD2 from the DC power inputs to select one of the DC voltages between VD1 and VD2. The selection control can be done automatically by a controller or done manually.

FIG. 3B is an example of 3:1 selector 350 to select a DC voltage among the DC input voltages VD1, VD2 and No Connect/VD3 for output. Simply for illustration purpose, the selector output is connected to three hot wires 356, 357, and 358 associated with three DC distribution circuits 366, 367 and 368 respectively. Each distribution circuit also includes a ground wire connected to a thicker main ground wire 359. The three DC distribution circuits may be three different ones, or they may be bundled together into a single superposed power distribution circuit with all three hot wires 356, 357, 358 carrying the same DC voltage. The selector output is different from a double-pole circuit breaker output that can carry different DC voltages. The examples in FIGS. 3A and 3B are mainly to illustrate the variations in DC power distribution circuits, which may be as simple as two wires, or a combination of multitude of hot wires and ground wires.

Either mechanical protection devices or solid-state protection devices may be chosen for a circuit breaker or power selector. If mechanical safety devices are chosen to include in a circuit breaker or selector, it may take more space and would be slower in response to power abnormalities than a solid-state device counterpart. But the voltage drop across a mechanical safety device is often less than a solid-state device and consumes less power when monitoring the power abnormality in a power distribution circuit. Thus, the mechanical safety device is a preferred solution for the circuit breaker or selector installed in main power panel, while the solid-state safety device may be a better choice for a local adaptor protecting electronic devices plugged on it.

The protection devices illustrated in 2:1 selector 300 in FIG. 3A may include mechanical overload protection, such as the use of thermal bimetal strip, the short circuit protection, such as the use of electro-magnetic coil, and the arc protection, such as the use of an arc chute, for DC power protection. Since DC is a constant voltage power, switching off or changing the selection of DC power inputs often generates arc, an arc chute to quench the switching arc would minimize arc damage to the selector or circuit breaker.

The ground wire is a safety feature in AC power distribution, however in DC power distribution the ground wire provides a current return path for devices using the DC power. The ground wire also provides a reference potential for the devices. Although a local ground connection at the socket location can function as a ground voltage reference, the local ground connection cannot be used as the DC current return path due to the high resistivity of earth ground.

While the ground wire carries no current in AC power distribution, the ground wire carries DC return current for DC power distribution. The size of the ground wire in the distribution circuit may determine the maximum DC current that can be delivered to the distribution circuit. A larger size ground wire is helpful.

Because an AC power distribution circuit can deliver two DC voltages to an AC socket or outlet, if one of the voltages available at the outlet is set to connect to a relatively high DC voltage, for example at 19.5V, and the other voltage is set to connect to a relatively low DC voltage, such as 5V, then the same distribution circuit could be used to deliver both the high and the low DC voltages concurrently to the existing AC sockets, where the high voltage, e.g. 19.5V DC, may be sourced from, for example, two 12V solar panels connected in series. A higher DC current from solar panels is controllable by connecting multiple solar panels in parallel. Since there is resistance in the power interconnect wires and voltage drop at each connection point of DC power distribution circuit, a 24V DC voltage output from two serially connected 12V solar panels may be just enough to provide a DC power of 19.5V, or at about 20% voltage drop, to a destination at a certain distance away from DC power source for devices to use. The 19.5V is a common output voltage from a power adaptor used by a HP laptop computer.

It is noted that if the relatively high DC voltage is connected to the phase wire and the relatively low DC voltage is connected to the neutral wire in a DC power distribution circuit, then for a 3-prong socket or receptacle connected to the DC power distribution circuit, the relatively high DC voltage would appear at the short slot and the relatively low DC voltage would appear at the long slot. The ground voltage would appear at the third grounding slot that will form a continuous path from the socket back to the power panel if a DC device is connected to the slot.

DC Power Attachment, DC Powers and Connections

In an AC and DC co-existent environment, an AC powered device uses an AC connector to plug into an AC socket to receive AC power. However, to receive DC power, one embodiment of the present invention uses a DC adapter, also referred to herein as a DC power attachment for plugging into an AC socket as well. The DC power attachment is coupled to the distribution circuit and the DC power input at power panel through the AC socket. The attachment may be adapted to plug into a 3-prong AC socket, or it may replace the AC socket and is mounted on a supporting structure to connect to a power distribution circuit directly. There may be a multitude of DC power connectors of different types on the power attachment for various DC powered devices to connect on the connectors for DC powers.

FIG. 4 illustrate the configuration of a DC power attachment 400, in accordance with an embodiment of the present invention, is different from the common power adapters which are in wide use today. The DC power attachment does not include an AC-to-DC power converter, nor its configuration is a direct one-to-one re-wiring from one 3-prong AC socket connector to another 3-prong AC socket connector simply to match the slot variations in various 3-prong AC sockets. It is also different from a 2-prong AC socket adapter (i.e. for plugging into a 2-prong AC socket at its input side) to re-connect into a 3-prong power connector at its output side, or vice versa, in a one-to-one connection, with the ground connection open.

In a DC power attachment 400, a hot wire input from a 3-prong AC socket 410 is grouped with a ground input, which is also taken from the 3-prong AC socket 410, to form a first DC power connector 420. A first set of DC power connectors can thus be formed in this way. The second hot wire input from the 3-prong AC socket 410 is also grouped with the ground input to form a second DC power connector 430. A second set of DC power connectors can also be formed in this way. The two sets of DC power connectors may be at the same DC voltage and of the same type for similar DC devices to use.

Alternatively, the two sets of DC power connectors including connectors 420, 430 respectively may be of different types, in different geometries/configurations, and at the same voltage or at different voltages. For example, one set of connectors may be configured for high voltage DC devices to use, such as laptop, while the other set is configured for use by low voltage DC devices, such as cellular phones. Regardless of geometry and configuration, each power connector has a DC voltage and a ground wire to provide the needed DC power and the ground conductor for each DC device.

Since there is no AC-to-DC conversion unit in the DC power attachment 400 and since no heat is generated inside the DC attachment, the DC power attachment has more space available for a relatively larger number of DC power connectors to be placed on it, so that more DC devices can be connected to the power attachment unit 400. In other words, a single AC socket, in accordance with embodiments of the present invention, would provide more DC connections and more DC voltages.

The DC power attachment provides flexibility and is user-friendly in applications. For example, if a USB type-C connector or another new type of connector becomes the mainstream power connector to replace the older micro-USB connector or the legacy USB connector, then a simple inclusion or modification of the DC power attachment can provide a matching connection with multiple connectors to support the entire adaptor family for most users.

An AWG 12-gauge wire is commonly used in a building for AC power distribution. It typically carries up to 20 A of AC current at nominal temperature. Since the DC current can be distributed evenly over the entire cross-section of a conductor without skin effect and since there is no impedance encountered by DC current flow, an AWG 12-gauge wire could carry more DC current to deliver at a longer distance between the DC power source and the user than that for AC. A thinner insulation layer can be chosen as a DC power cable to save cost due to safer DC power. In addition, there is no capacitance coupling to the surroundings for the DC power transmission, nor having any AC electromagnetic wave (EM) noise as an AC current flow does. There are much more advantages for DC power distribution than AC. In case the DC current on a distribution circuit is reduced, the DC power can be transmitted further away due to a smaller IR drop. Or, if a thicker cable of lower resistivity wire is chosen for DC delivery, then the DC power transmission distance can be extended further.

Most laptop computers today use a DC voltage of nearly 20V. This DC voltage may be selected as the high DC voltage and delivered to a DC power attachment connected to a DC power distribution circuit for laptops or similar devices to use. For example, a power adaptor for HP i7© laptop computer outputs 18.5V at 3.5 A DC, or 65 Watts DC power for the i7 laptop to use, while the pow adaptor for a HP i5 laptop computer outputs 19.5V at 2.31 A DC, or 45 W DC power for i5 laptop to use. Thus, at least a total of six laptops may be connected to a DC power attachment, if it is sourced with a 20 A and 19.5V DC or 390 watts of power. The six laptop computers may be all connected to the same DC power attachment or distributed among multiple DC power attachments connected at different sockets on a DC power distribution circuit. One disadvantage of a high DC voltage delivery is that at times it may require to step down the high DC voltage into lower voltages, such as 5V or 3.3V, or even lower, for low voltage DC electronic devices to use.

In another example, a typical AC power adapter connected to an 120V AC power socket may have a USB port to output 5V at 1 A current for consumer devices to use. Thus, if assumes a hot wire carrying 5V and 20 A DC current on a distribution circuit, then it would be capable of powering a total of about 20 hand-held devices for plugging into a DC power attachment on the same 20 A DC distribution circuit.

The 20 A current carrying capability is good for each AWG 12-gauge wire, including the ground wire which has same cross section as the two hot wires, i.e. the ground wire current is also limited to 20 A. Thus, the total numbers of laptop computers and the total number of hand-held mobile devices that can be connected simultaneously to a power attachment may be halved to 3-unit and 10-unit respectively, unless two ground wires are included in the power distribution circuit to become a 4-wire power cable, or the cross section of the ground wire is doubled to double the ground return current support up to 40 A. A thicker ground wire is helpful in the DC power distribution.

Desktop computers, servers or workstations require more power, for example about 200 W of power, to operate. To meet such a high-power requirement, a better solution is to increase the DC power delivery voltage.

In one embodiment, the DC voltage supply on the power distribution circuit is increased to, for example, 40V DC, sourced from a 48V DC solar panel with an 8V voltage drop tolerance. At a higher DC voltage under the same current density of 20 A, more DC power could be delivered for use. For example, at 40V DC on a 20 A circuit, a total about four 200 W desktop computers or servers could be connected to a DC power attachment, if assuming an 8V loss from a 48V DC power source. This is a significant improvement in the number of DC devices that can be connected to an AC socket location through a DC power attachment, provided that the DC power connector can withstand such a high current/power without exceeding its power rating.

Variation in Power Panel

A different type of power panel may be implemented by using a multiplexer to select power source between the AC power and a set of DC powers before providing the selected power as input to all circuit breakers in the power panel. This type of power panel requires to include a GFCI or RCD circuit breaker at the front end of AC power input, so that all successive circuit breakers sourcing their AC power from the output of GFCI or RC circuit breaker could then be functioning as AC circuit breakers or as DC circuit breakers in the power panel. The circuit breakers that can be interchangeably used for AC power switching or DC switching should be in double-pole, single throw configuration. Depending upon application, the circuit breaker output would be connected to a phase wire and neutral, or two hot wires respectively. This is different from the configuration of a composite power panel, where each circuit breaker or selector installed in the power panel has a flexibility to connect or to select either the AC power or the DC power inputs.

Variations in DC Power Attachment

Some embodiments of the present invention include a DC-to-DC power converter in the DC power attachment to adjust the DC voltage level up or down to meet the required DC voltage. As time goes, more and more electronic devices may require lower and lower DC voltages, such as 3.3V, 1.5V or even only 1.1V to operate. If, for example, a relatively lower DC voltage is required to power a device, the voltage may be supplied either directly by the DC power source from the power panel or by using a DC-to-DC converter disposed in the DC power attachment to vary the DC voltage to the required level. FIG. 5 shows some embodiments including safety features in a DC power attachment 500, such as power good LED lights 521, 522 to indicate the availability of the DC power on each hot wire, i.e. power on the neutral prong 511 and the phase prong 522, as well as an AC warning LED 523 to indicate the presence of the AC power at the AC socket 510 where DC power attachment is wrongly inserted on it. A resistor is connected in series with each LED light to limit its current. It may happen that DC power is delivered to an AC socket but has no DC power attachment mounted on the socket, or a user may accidentally plug an AC power adapter into an AC socket supplying DC power. In case a transformer is in the AC power adaptor, it may cause a power short. To avoid a short circuit or other abnormality, the respective DC circuit breaker connected to the AC socket must trip in order to disconnect the DC power from the power distribution circuit. It is helpful for an AC socket to have LED lights to indicate the existence of AC power or DC power respectively to prevent improper connection by users. Although the AC warning LED in FIG. 5 may function as a diode, an extra protective diode 524 is added in series to the AC warning LED 523 to block DC voltage from the high DC input prong to the lower voltage one. Here, it implicitly assumes the phase prong 512 has a higher DC voltage than that of the neutral prong 511. In addition, there may be DC voltage variations during the plugging and unplugging of DC devices at the output connectors of power attachment 500. An additional diode 524 along the AC warning LED 523 path is helpful to mitigate and to block the potential DC noises between the two DC voltages input to power attachment 500 during DC devices plug/unplug Transition from AC World into DC—More Effective Use of DC Energy DC power is more efficient in energy delivery and energy utilization. It is desirable to have DC power directly available from a power connector to benefit from its many advantages. It is a huge energy waste for the DC power generated by solar panels to be inverted into AC and delivered to an AC power grid, and then a power panel receives the AC power from the grid and delivers it to AC sockets where it is converted back to DC power to power home appliances, such as TVs, computers, cellular phones. The conversion from DC to AC and then back to DC is not an efficient use of energy. A large amount of AC power is wasted in the conversion process in the form of heat. Some days if the industry could manufacture appliances and equipment that directly use the DC power, it is an anticipated transition. With a direct use of DC power source and the prevailing use of DC-only devices and appliances are the most efficient way in using and conserving energy. The composite power panel, the DC circuit switch or the composite circuit switch, and the method to connection DC power to the power distribution circuit pave the way for the transition into a DC centric living environment.

Personal computers and workstations are often bulky and heavy because of a relatively large power supply they use. A cooling fan is usually used to cool the power supply, which may be noisy. If the personal computer or the workstation can directly receive DC power without requiring an internal power supply to convert AC power into DC for use, a substantial change in design of the personal computer may happen. The size, weight, and cost of the computer could be substantially reduced. A lighter, quieter, more compact and elegant computer may dominate the marketplace, while saving energy.

In some instances, the power utility company may directly supply DC power. A DC-to-DC power converter may be used to step the DC voltage down to the required DC voltages at a local DC power source before input to power panel.

Connection Cables for DC Power Attachment

DC power is safer than AC power. DC power shock is negligible at low DC voltages. A thin layer of insulation is adequate to protect from DC abnormality, a lighter power cable, including conductor of smaller cross section and thin insulation layer, is applicable for DC power connection.

To make DC power ubiquitous, power cable plays a role. Different power cables may be selected for different DC devices to connect to different DC voltages. For example, a USB cable may be chosen to connect a hand-held device to a low DC voltage connector on the DC power attachment. A laptop computer requiring a higher DC voltage to operate may use a power cable with male plugs at both ends, for example, with a 3.0 mm×1.1 mm male plug to connect to a DC connector on the DC power attachment to obtain DC power. Other cable configurations are also feasible. For example, a low voltage DC power cable may have a legacy USB male connection head in one end and a male USB type-C connection head on the other end that matches the configuration of the connector on DC power attachment and the connector at electronic device.

When DC power is available on an AC socket, a DC power attachment for plugging into an AC socket may be configured to match the variations of AC sockets among different countries with a multitude of standard DC connectors on the power attachment for various DC devices to use. This would bring substantial convenience for individuals, and travelers in particular, as they may only need to carry a pair of compact, simple, light-weight power cables, one for a low power DC device to use, such as a cellular phone, and the other for a high power DC device to use, such as laptop, when on-the-go. The DC power attachment and standard cables provides the flexibility to get DC power from the existing AC power outlets. A single AC socket for a DC power attachment to plug in is adequate to source multiple DC power connections for different DC devices to use.

SUMMARY AND CONCLUSION

The embodiments on the method and apparatus to source AC and DC power concurrently by using various AC and DC circuit breakers installed in a composite power panel, and to leverage the existing power distribution infrastructure to deliver AC or DC powers to respective power distribution circuit could eventually revolutionize the prevailing AC power usage today. In an AC and DC power co-existing environment, an electricity distribution circuit and its sockets have the flexibility to be an AC power distribution circuit or a multi-DC power distribution circuit, depending on the type of the circuit breakers, such as an AC, DC, or composite circuit breaker, being installed in a power panel and the way the output of circuit breaker outputs being connected to the electrical distribution circuit. A DC power attachment may be plugged into an existing AC socket or coupled directly to a power distribution circuit.

Transition from current AC-oriented environment, to one in which AC and DC power can co-exist environment, and finally to a DC-centric environment provides substantial advantages. Embodiments described herein thus bridge the transition in the power usage from AC to DC, so as increase energy efficiency, reduce waste and pollution.

What is claimed:

1. A method to co-distribute AC and DC powers in a power distribution system, the method comprises:
    providing an AC power;
    providing a plurality of DC powers;
    providing a power panel coupling to the AC power and the plurality of DC powers;
    providing a plurality of circuit breakers installed in the power panel;
    coupling a plurality of power distribution circuits to a plurality of circuit breakers installed in the power panel, wherein each power distribution circuit comprises at least three wires including more than one power interconnects and a ground wire, and a plurality of sockets being connected to each power distribution circuit with each socket comprising at least two power slots and a ground slot;
    wherein a first one of the plurality of circuit breakers with input coupled to the AC power and output coupled to a first one of the plurality of power distribution circuit provides the AC power to the plurality of sockets connected to the first one of the plurality of power distribution circuits, and
    wherein a second one of the plurality of circuit breakers has an input coupled to the plurality of DC powers and an output coupled to a second one of the plurality of power distribution circuits, wherein a first power interconnect in the second power distribution circuit is coupled to a first DC power selected from the plurality of DC powers to deliver the first DC power to a first power slot on each of the plurality of sockets connected to the first power interconnect, wherein a second power interconnect in the second power distribution circuits is coupled to a second DC power selected from the plurality of DC powers to deliver the second DC power to a second power slot on each of the plurality of sockets connected to the second power interconnect, and wherein the ground wire in the second power distribution circuits functions as DC current return path for the first and the second power interconnects;
    an AC connector for plugging into one of the plurality of sockets connected to the first power distribution circuit to obtain the AC power; and
    a DC power attachment, including a plurality of DC connectors, for coupling to one of the plurality of sockets connected to the second power distribution circuit to provide the first DC power and the second DC power to a plurality of DC devices connected to the plurality of DC connectors respectively on the DC power attachment.

2. The method of claim 1, wherein the first DC power and the second DC power are same DC power.

3. The method claim 1, wherein the first DC power and the second DC power are DC powers of different voltages.

4. The method of claim 1, wherein the first DC power is a high DC voltage providing DC power for high power devices to use and the second DC power is a low DC voltage, lower than the high DC voltage, providing DC power for low power devices to use.

5. The method of claim 1, wherein the DC power attachment being coupled to the second power distribution circuit is mounted at supporting structure to replace socket.

6. A method to connect a power distribution circuit in a building for DC power distribution, the method comprising
    proving a plurality of DC powers to a power panel;
    using a circuit breaker to connect to at least one DC power from the plurality of DC powers at its input, and with output of the circuit breaker being connected to the power distribution circuit,
    wherein the power distribution circuit comprises two power interconnects connected to a plurality of sockets, with each socket comprising two power slots and a ground slot for devices to obtain DC powers,
    wherein a first one of the two power interconnects is coupled to a first one of the plurality of DC powers, and a second one of the two power interconnects is coupled to a second one of the plurality of DC powers, to deliver the first one of the plurality of DC powers and the second one of the plurality of DC powers to each of the plurality of sockets connected to the power distribution circuit,
    wherein the ground wire being coupled to the ground slot on each of the plurality of sockets operates as a current return path for the first one and the second one of the plurality of DC powers; and
    wherein a DC power attachment, coupled to one of the plurality of sockets connected to the power distribution circuit, includes a plurality of DC connectors to obtain the first one of the plurality of DC powers and the second one of the plurality of DC powers from the two power interconnects respectively for DC devices to use.

7. The method of claim 6, wherein the first DC power and the second DC power are same voltage.

8. The method of claim 6, wherein the first DC power and the second DC power are at different voltages.

9. The method of claim 6, wherein the plurality of DC connectors on the DC power attachment are same type.

10. The method of claim 6, wherein the plurality of DC connectors on the DC power attachment are different types.

11. The method of claim 6, wherein the plurality of sockets connected to the power distribution circuit have same configuration as an AC power socket.

12. The method of claim 6, wherein a single DC power selected from the plurality of DC powers is connected to the circuit breaker and is configured to connect to at least one of the two power interconnects in the power distribution circuit.

13. The method of claim 6, wherein the circuit breaker is a double-pole, single-throw switch to select and control delivery of a high DC voltage to a first one of the two power interconnects, and to select and to control delivery of a low DC voltage to a second one of the two power interconnects.

14. The method of claim 6, wherein the circuit breaker comprises two respective single-pole, single throw (SPST) switches to select and control delivery of two DC powers from the plurality of DC powers to the power distribution circuit.

15. The method of claim 6 wherein the circuit breaker is a DC circuit breaker comprising DC power control switch, short circuit protection, overload protection, and arc protection.

16. The method of claim 6, further comprising:
connecting an AC power to the power panel;
installing a second circuit breaker in the power panel connected to a second power distribution circuit, wherein the second circuit breaker has an input coupled to the AC power and an output coupled to the second power distribution circuit, wherein the second circuit breaker distributes the AC power to each of the plurality of sockets connected to the second power distribution circuit; and
distributing the AC power and the at least one DC power from the plurality of DC powers concurrently to respective power distribution circuits to form an AC and DC co-distribution system.

17. The method of claim 16 wherein said second circuit breaker is an AC circuit breaker comprising an AC power control switch and one or more of a short circuit protection, overload protection, arc protection and shock protection.

18. The method of claim 17, wherein the power panel is a composite power panel s and receives inputs from the AC power and the plurality of DC powers, wherein the power panel comprises at least one circuit breaker connected to the AC power and at least one of the plurality of DC powers.

19. The method of claim 16, wherein the at least one circuit breaker is a composite circuit breaker.

20. An AC and DC power co-distribution system comprising:
an AC power input;
a plurality of DC power inputs;
a plurality of power distribution circuits, wherein each power distribution circuit comprises a plurality of wirings comprising at least two power interconnects and a ground wire;
a composite power panel comprising a plurality of circuit breakers, wherein
a first one of the plurality of circuit breakers is an AC circuit breaker having input coupled to the AC power input and having an output coupled to an AC power distribution circuit in the plurality of power distribution circuits for AC power delivery to sockets connected to the AC power distribution circuit for AC devices to receive AC power from sockets; and
a second one of the plurality of circuit breakers is a DC circuit breaker having input coupled to the plurality of DC power inputs and having output coupled to a DC power distribution circuit in the plurality of power distribution circuits, wherein
a first one of the at least two power interconnects in the DC power distribution circuit being coupled to a first one the plurality of DC power inputs and also coupled to a first power slot in sockets connected to the DC power distribution circuit, and
a second one of the at least two power interconnects in the DC power distribution circuit being coupled to a second one of the plurality of DC power inputs also coupled to a second power slot in sockets connected to the DC power distribution circuit, and
the ground wire in the DC power distribution circuit, being coupled to ground slot in sockets connected to the DC power distribution circuit, functions as current return path for the first one of and the second one of the plurality of DC power inputs delivered to the first power slot and the second power slot on sockets.

21. The AC and DC power co-distribution system of claim 20, wherein the AC power input from utility company comprises two phase lines at 180° out of phase and a neutral, wherein
one of the phase lines and the neutral is connected to obtain 120V as the AC power input to the composite power panel in the US and 230V as the AC power input to the composite power panel in Europe; and
two phase lines are connected to obtain 240V as the AC power input to the composite power panel in the US.

22. The AC and DC power co-distribution system of claim 20, wherein the first one of the plurality of DC powers and the second one of the plurality of DC powers are same DC voltage.

23. The AC and DC power co-distribution system of claim 22, wherein
the first one of the plurality of DC powers carries a high DC voltage coupled to the first power slot on sockets and the second one of the plurality of DC powers carries a low DC voltage coupled to the second power slot on sockets connected to the DC power distribution circuit.

24. The AC and DC power co-distribution system of claim 20 wherein the plurality of DC power inputs are selected from solar panel, wind turbine, battery, DC powers from utility provides, and output from AC-to-DC power converters.

25. The AC and DC power co-distribution system of claim 20 further comprising:
a third circuit breaker in the plurality of circuit breakers including a control switch to select input from the AC power input and from at least one of the plurality of DC power inputs for output to a third power distribution circuit connected to the third circuit breaker, wherein the control switch
selecting one of two phase lines and the neutral from the AC power inputs as 120V AC input to the third circuit breaker in the US and as 230V AC input to the third circuit breaker in Europe; and
selecting two phase lines from the AC power inputs as 240V AC input to the third circuit breaker in the US; and
selecting at least one DC power from the plurality of DC power inputs as input to the third circuit breaker for coupling to two power interconnects in the third power distribution circuit.

26. The AC and DC power co-distribution system of claim 20, comprising AC power control switch and AC circuit protection devices, including short circuit protection, overload protection, arc protection and shock protection.

27. The AC and DC power co-distribution system of claim 20 further comprising a DC power control switch and a circuit protection devices including short circuit protection, overload protection, and arc protection.

28. A DC power attachment unit adapted to couple to socket connected to a power distribution circuit coupling with a first and a second DC voltages, comprising:
- an input connector for plugging into socket comprising a first and a second power slots and a ground slot; and
- a plurality of output connectors adapted for connection by a plurality of DC devices respectively, wherein
- a first one of the plurality of output connectors receives the first DC voltage from the first power slot and ground voltage from the ground slot to supply a first DC power, and
- a second one of the plurality of output connectors receives the second DC voltage from the second power slot and ground voltage from the ground slot to supply a second DC power.

29. The DC power attachment of claim 28 wherein the first DC voltage and the second DC voltage have the same DC voltage.

30. The DC power attachment of claim 28 wherein the first DC voltage is different from the second DC voltage.

31. The DC power attachment of claim 28 wherein a first subset of the plurality of output connectors have a different configuration and geometry from a second subset of the plurality of output connectors, wherein the first subset and the second subset deliver same DC voltage.

32. The DC power attachment of claim 28 further comprising LED light indicator adapted to indicate availability of the first DC voltage and the second DC voltage.

33. The DC power attachment of claim 28 further comprising an LED adapted to warn a wrong connection to AC power, wherein the LED light is placed between inputs of the first DC voltage and the second DC voltage, and wherein the LED is reverse-biased from a higher of the first and the second DC voltages.

34. The DC power attachment of claim 28 further comprising a DC-to-DC voltage converter coupled to one DC voltage selected from the first DC voltage at the first power slot and the second DC voltage at the second power slot and grouped with the ground voltage at the ground slot to convert the selected DC voltage into different DC voltage for coupling to at least a subset of the plurality of output connectors on the DC power attachment.

35. The method of claim 28 wherein the first and second DC voltages are provided without an AC-to-DC converter in the power attachment.

36. A power panel comprising:
- a multiplexer configured to select between an AC power and a plurality of DC powers to provide the selected power to a plurality of circuit breakers disposed in the power panel.

37. The power panel of claim 36, further including a ground fault circuit interrupt device at the input path of AC power.

38. The power panel of claim 36, wherein the plurality of circuit breakers is double-pole, single-throw circuit breaker with two outputs connected to two hot wires respectively of a power distribution circuit.

\* \* \* \* \*